US007593204B1

(12) United States Patent
Iversen et al.

(10) Patent No.: US 7,593,204 B1
(45) Date of Patent: Sep. 22, 2009

(54) ON-CHIP ESD PROTECTION CIRCUIT FOR RADIO FREQUENCY (RF) INTEGRATED CIRCUITS

(75) Inventors: Christian Rye Iversen, Vestbjerg (DK); Swaminathan Muthukrishnan, Greensboro, NC (US); Nathaniel Peachey, Oak Ridge, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 406 days.

(21) Appl. No.: 11/609,497

(22) Filed: Dec. 12, 2006

Related U.S. Application Data (60) Provisional application No. 60/811,255, filed on Jun. 6, 2006.

(51) Int. Cl.
*H02H 9/00* (2006.01)
*H02H 1/00* (2006.01)
(52) U.S. Cl. ........................................................ 361/56
(58) Field of Classification Search .................... 361/56
See application file for complete search history.

(56) References Cited

U.S. PATENT DOCUMENTS

| 7,280,332 B2 * | 10/2007 | Ma et al. ..................... 361/91.1 |
| 2005/0014473 A1 * | 1/2005 | Zhao et al. ..................... 455/83 |
| 2005/0189560 A1 * | 9/2005 | Park ............................ 257/192 |
| 2005/0242365 A1 * | 11/2005 | Yoo ............................ 257/103 |
| 2006/0006554 A1 * | 1/2006 | Yoo et al. ..................... 257/900 |
| 2007/0109697 A1 * | 5/2007 | Huh ............................ 361/56 |
| 2008/0062595 A1 * | 3/2008 | Ping et al. .................... 361/56 |

OTHER PUBLICATIONS

Swaminathan Muthukrishnan et al., "A Novel On-Chip Protection Circuit for RFICs Implemented in D-Mode pHEMT Technology," Jan. 2007.
"Transistor," http://en.wikipedia.org/wiki/Transistor (last visited Jun. 23, 2006).
"Diode," http://en.wikipedia.org/wiki/Diode (last visited Jun. 23, 2006).
"Field Effect Transistor," http://en.wikipedia.com/wiki/Field_effect_transistor (last visited Jun. 23, 2006).
"HEMT," http://en.wikipedia.com/wiki/PHEMT (last visited Jun. 23, 2006).
JEDEC Solid State Technology Association, "Electrostatic Discharge (ESD) Sensitivity Testing Human Body Model (HBM)," JESD22-A114C (Revision of JEDS22-A114-B), Jan. 2005, pp. 1-14, Arlington, VA.
Electronic Industries Association/JEDEC Solid State Technology Association, "Electrostatic Discharge (ESD) Sensitivity Testing Machine Model (MM)," EIA/JESD22-A115-A (Revision of EIA/JESD22-A115), Oct. 1997, pp. 1-9, Arlington, VA.

* cited by examiner

*Primary Examiner*—Ronald W Leja
(74) *Attorney, Agent, or Firm*—Withrow & Terranova, P.L.L.C.

(57) ABSTRACT

Methods and apparatus for ESD protection of pseudomorphic high electron mobility transistor (pHEMT) circuitry are described. In one method, an ESD surge is detected at a trigger circuit. An ESD protection circuit is triggered. Current flow within the trigger circuit is limited and ESD energy is dispersed to a ground plane via the ESD protection circuit.

19 Claims, 7 Drawing Sheets

ON-CHIP ESD PROTECTION CIRCUIT FOR RADIO FREQUENCY (RF) INTEGRATED CIRCUITS

RELATED APPLICATIONS

This application claims the benefit of U.S. Provisional Patent Application Ser. No. 60/811,255, which was filed in the U.S. Patent and Trademark Office on Jun. 6, 2006, which is incorporated herein by reference.

FIELD OF THE INVENTION

The subject matter described herein relates to electrostatic discharge (ESD) protection circuitry. More particularly, an ESD protection circuit for radio frequency (RF) integrated circuits that exhibits a low on-state resistance and low parasitic capacitance is described.

BACKGROUND OF THE INVENTION

Electrostatic discharge (ESD), which is a large subset of electrical overstress (EOS), is a major reliability issue in integrated circuits (ICs). EOS and ESD together account for more than 60% of failures in ICs. As semiconductor devices have scaled to smaller dimensions and ICs have become more complex, the potential for destructive ESD events has become more serious.

More recently, there has been a tremendous demand for increasing the ESD robustness of Radio Frequency Integrated Circuits (RFICs) especially for wireless applications, since such products, typically handheld devices, are much more prone to ESD-induced damages.

Figure 1:
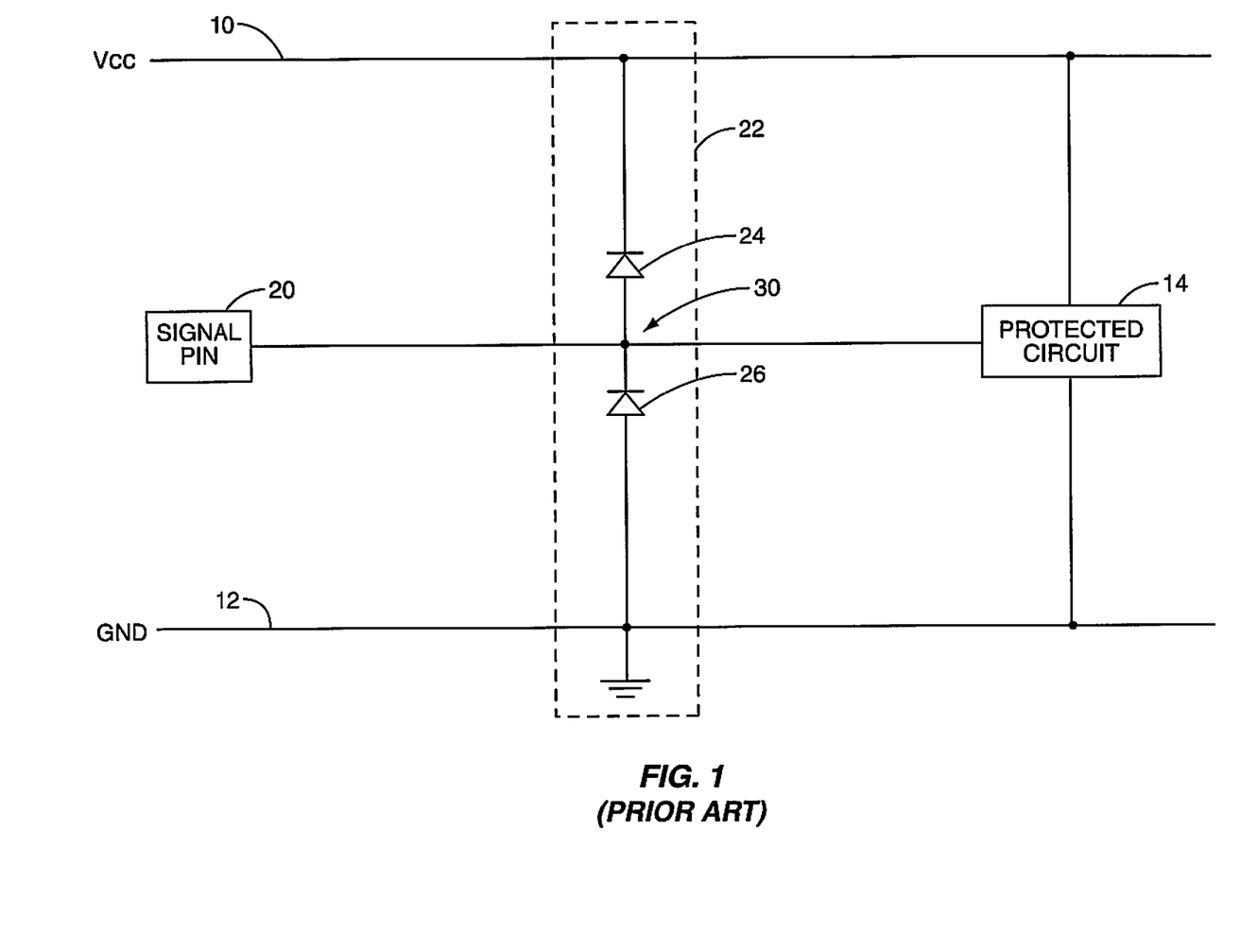
FIG. 1 illustrates a conventional electrostatic discharge (ESD) protection circuit which channels ESD energy to both power and ground rails.

FIG. 1 illustrates a conventional ESD protection circuit. As can be seen from FIG. 1, a voltage rail (Vcc) 10 and a ground rail (GND) 12 are illustrated. A protected circuit 14 is illustrated connected between the voltage rail 10 and the ground rail 12. A signal pin 20 provides a signal path to the protected circuit 14.

A conventional ESD protection circuit 22 is connected between the voltage rail 10 and the ground rail 12. The conventional ESD protection circuit 22 includes a diode 24 and a diode 26, which are connected in series. The cathode of diode 24 is connected to the voltage rail 10 and the anode is connected to the signal pin 20 at a node 30 on the signal path between the signal pin 20 and the protected circuit 14. The anode of the diode 26 is connected to the ground rail 12 and the cathode is connected to node 30 on the signal path from the signal pin 20 to the protected circuit 14.

For positive-going ESD surges on the signal pin 20, the diode 24 will become forward biased and will clamp the voltage on the signal pin 20 to one diode drop above the voltage rail 10. Energy from the ESD surge will be conducted through the diode 24 in a forward biased mode and dispersed into the voltage rail 10. Appropriate ESD protection structures have to be implemented (not shown) in the voltage rail 10 to eventually dissipate the ESD pulse to the ground rail 12.

For negative-going ESD surges on the signal pin 20, voltage on the signal pin 20 will be clamped to one diode drop below the ground rail 12 by the diode 26. Though the diode 26 will be in a forward biased mode, the diode 26 provides a low-impedance path relative to the protected circuit 14. Accordingly, energy from the ESD surge will be dissipated into the ground rail 12.

The conventional ESD protection circuit 22 of FIG. 1 is widely used in CMOS technologies. Accordingly, ESD protection for CMOS ICs is relatively mature. However, ESD protection circuitry for newer technologies is still in its infancy.

Gallium-Arsenide (GaAs) is often used for power amplifiers (PAs) and switches because of its intrinsically higher low-field electron mobility, transition frequency, and breakdown voltage. For low noise amplifiers, switches, and PAs, GaAs pseudomorphic high electron mobility transistor (pHEMT) technology is used. However, ESD protection circuitry for GaAs pHEMT technology that is currently in use provides undesirable characteristics.

Ideally, an ESD protection system must not affect the input/output (I/O) signal under normal operating conditions. However, current GaAs pHEMT ESD protection structures have unwanted parasitic capacitances and resistances which may adversely affect performance of radio frequencies (RF) circuits. In particular, at RF frequencies, the parasitics associated with the ESD structures can lead to impedance mismatches. Impedance mismatches can cause signal reflection which degrades the performance of the circuit which it is intended to be protected.

Additionally, a protection circuit, such as that shown in FIG. 1, is unsuitable for pHEMT switches. A signal presented to a pHEMT switch may swing to several times the supply voltage in the transmit port. Accordingly, a rail clamp, such as the diode 24 in FIG. 1, would "clip" the signal since the diode 24 is forward biased to the power rail when the signal swings to more than one diode drop above the voltage rail 10.

In an attempt to provide an ESD protection circuit which does not clamp the signal at one diode drop above a voltage rail, other ESD protection circuits used in pHEMT technology use a diode stack with diodes placed in a forward biased arrangement between the signal, such as node 30 of FIG. 1, and the ground rail 12. However, a diode stack for this application can result in a diode stack of nine or more diodes in such an application. For example, a pHEMT switch connected to a GSM power amplifier that can have an output power of 34 dBm may have an instantaneous voltage of more than three (3) times the power supply. Accordingly, for a six-volt power rail, an ESD protection circuit should remain inactive for voltages lower than eighteen (18) volts. Considering that the forward voltage drop of a diode in a diode stack will range from 0.6 to 0.7 volts, it is readily seen that a very large stack of diodes may be required in order to provide appropriate protection for the circuit.

The use of large diode stacks for ESD protection circuitry also increases diode size. Because each diode in a diode-stack configuration is connected in series, each diode in a stack must carry all of the current during an ESD event. Accordingly, all diodes in a diode stack must be dimensionally sized for carrying large ESD currents. This increase in diode size correlates to an increase in cost of manufacturing and, thereby, cost to consumers.

Another issue with the use of diode stacks is associated with the on-state resistance of the stack. Each diode in the stack has an on-state resistance associated with it. Accordingly, as the number of diodes in the stack increases, the on-state resistance of the stack also increases. This increase in resistance can increase the clamping voltage of the circuit to a level sufficient to damage the core circuitry that is to be protected.

A solution to the on-state resistance is to place several diode stacks in parallel. However, though paralleling several diode stacks improves the on-state resistance of the ESD protection circuit, it has two additional problems associated with it. First, by paralleling redundant stacks of diodes, the area required for the ESD protection circuitry increases dramatically. Second, because each diode has a parasitic capacitance associated with it as well, the parasitic capacitance of the ESD protection circuit increases as the number of diode stacks that are paralleled increases. This increase in parasitic capacitance negatively affects circuit performance, as described above.

Accordingly, an ESD protection circuit having a high trigger voltage that is small in size and has low on-state resistance and low parasitic capacitance is needed.

SUMMARY OF THE INVENTION

An electrostatic discharge (ESD) protection circuit between a signal path and ground is described. A trigger sub-circuit detects a voltage on the signal path above a defined threshold and activates a main protection sub-circuit, which provides a discharge path to ground while the voltage signal remains above the threshold. The main protection sub-circuit avoids the use of an extended diode stack by employing a depletion-mode (D-mode) field effect transistor (FET) in series with a diode pair for the discharge path. The diode pair in the discharge path biases the transistor off during normal operation. The ESD protection circuit exhibits low on-state resistance and low parasitic capacitance when compared with conventional ESD protection circuits. The parasitic resistance of the diode pair along with the on resistance of the FET (Rdson) are sufficiently low to provide a low impedance path for the ESD pulse.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 2:
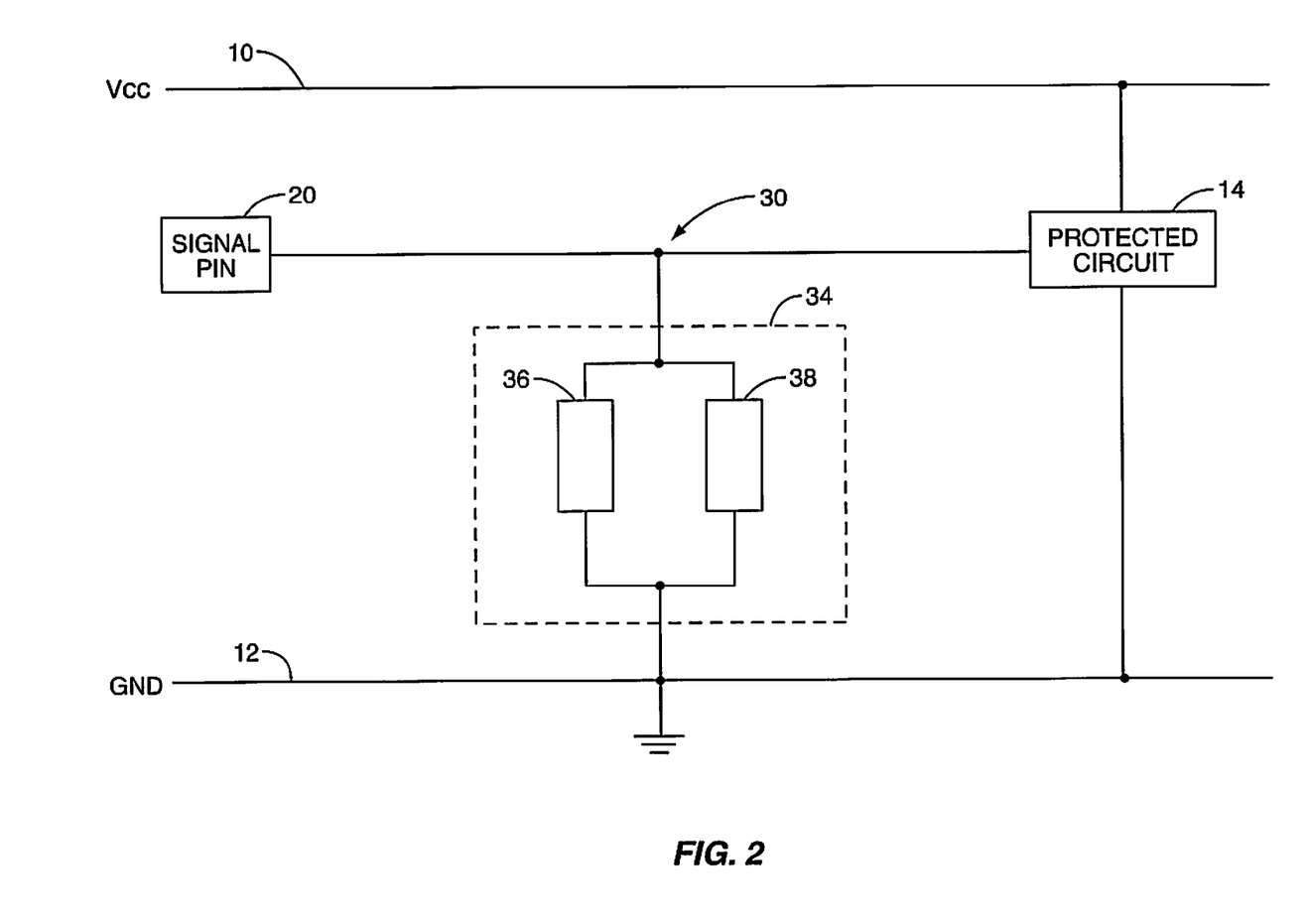
FIG. 2 illustrates an ESD protection circuit according to an embodiment of the present invention, including a trigger sub-circuit and a main protection sub-circuit.

FIG. 2 illustrates an electrostatic discharge (ESD) protection circuit according an embodiment of the present invention, including a trigger sub-circuit and a main protection sub-circuit. An ESD protection circuit 34 is illustrated including a trigger sub-circuit 36 and a main protection sub-circuit 38. The trigger sub-circuit-circuit 36 will detect ESD surge events and trigger the main protection sub-circuit-circuit 38. The ESD protection circuit 34 connects to the node 30 on the signal path between the signal pin 20 and the protected circuit 14 and to the ground rail (GND) 12. Accordingly, energy from an ESD surge will be channeled to the ground rail 12. As a result, no ESD surge energy will be required to be dissipated in the voltage rail (Vcc) and, the voltage rail 10 will be relieved of voltage transients associated with ESD surge events.

Figure 3:
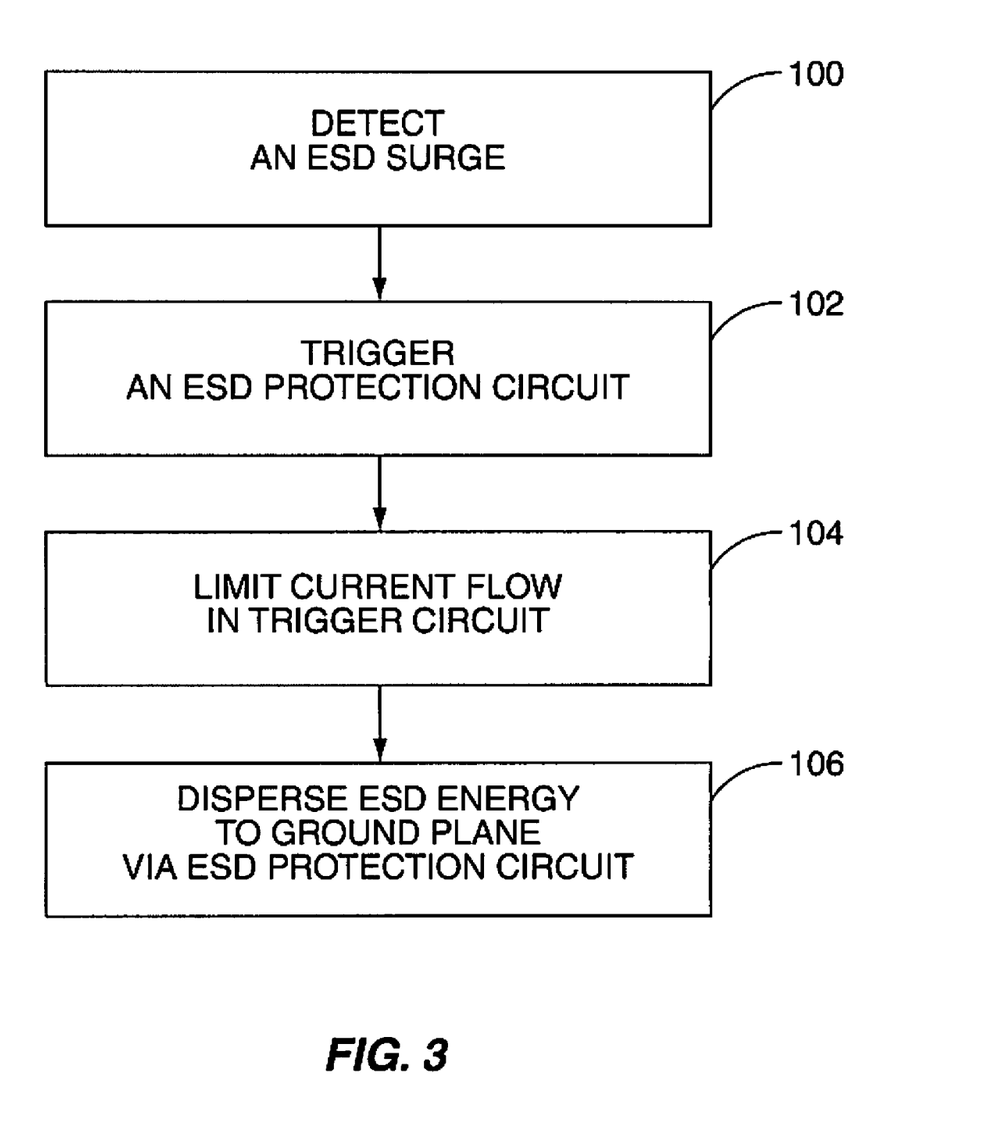
FIG. 3 illustrates exemplary steps of a process of providing ESD protection for a circuit according to an embodiment of the present invention.

FIG. 3 illustrates exemplary steps of a process of providing ESD protection for a circuit according to an embodiment of the present invention. Within the process of FIG. 3, an ESD surge is detected (step 100). For example, the trigger sub-circuit 36 of FIG. 2 may detect an ESD surge. The process triggers an ESD protection circuit (step 102). For example, the trigger sub-circuit 36 of FIG. 2 may trigger the main protection sub-circuit 38 when an ESD surge is detected.

The process limits current flow in the trigger circuit (step 104). For example, the trigger sub-circuit 36 may be designed so that current is limited in the trigger sub-circuit 36.

The process disperses ESD energy to a ground plane via the ESD protection circuit (step 106). For example, the main protection sub-circuit 38 of FIG. 2 may disperse ESD energy to the ground rail 12.

Figure 4:
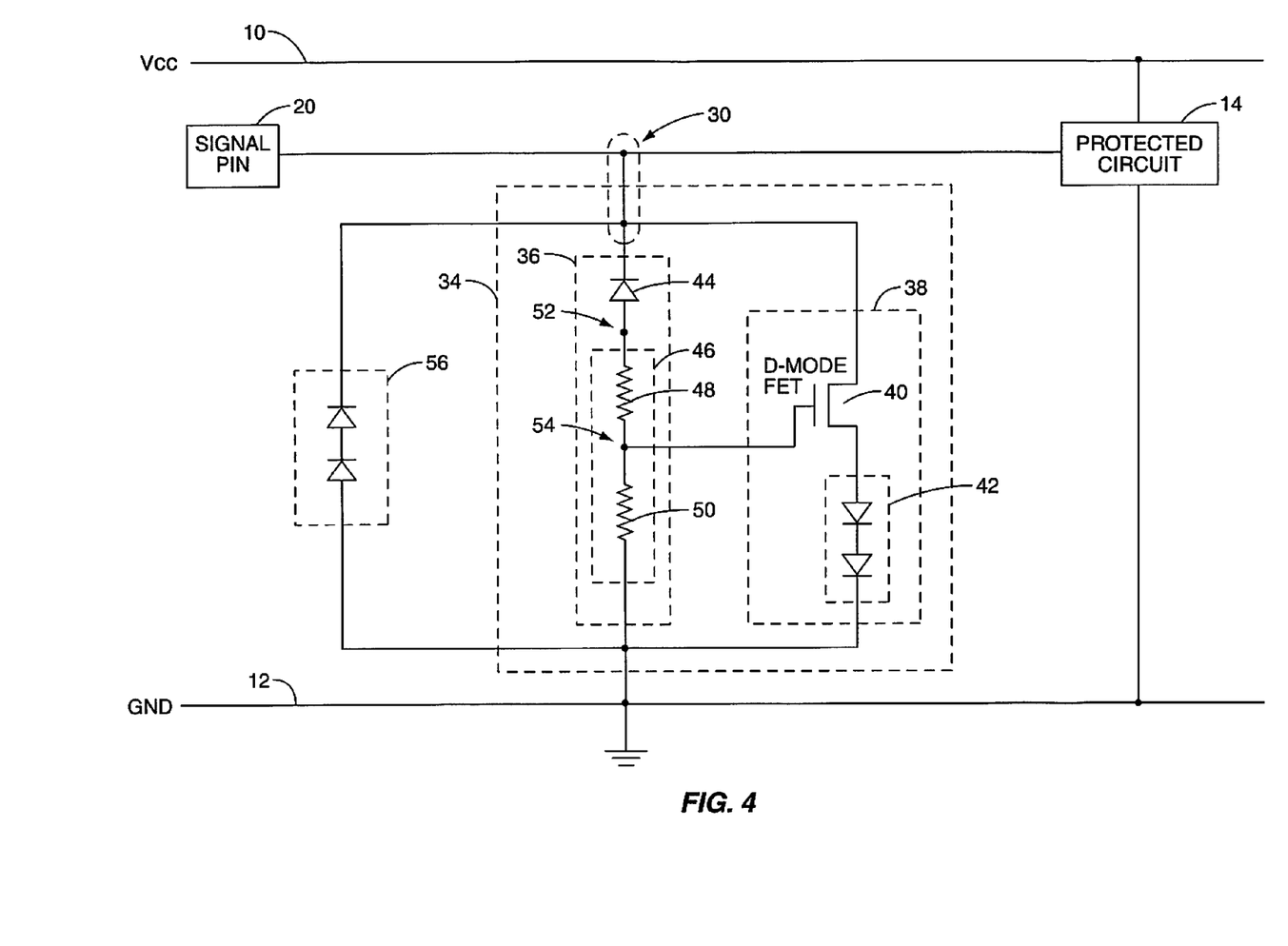
FIG. 4 illustrates an exemplary embodiment of the present invention where the trigger sub-circuit includes a diode which operates in reverse-breakdown mode to detect an ESD event followed by a resistor divider network that controls the gate of a depletion mode (D-mode) field effect transistor (FET) within a main protection sub-circuit, where the D-mode FET is followed by a diode stack to pinch off the D-mode FET during normal operation.

FIG. 4 illustrates an exemplary embodiment of the present invention where the trigger sub-circuit 36 and the main protection sub-circuit 38 are shown in more detail. Within the main protection sub-circuit 38, a D-mode FET 40 is illustrated. D-mode FET 40 will be in an "on" state when a gate and a source of the D-mode FET are at equal potential. Accordingly, a diode stack 42 is provided in order to pinch off the D-mode FET 40 during normal operation. The diode stack 42 may include any number of diodes sufficient to pinch off the D-mode FET 40. Within FIG. 4, the diode stack 42 is illustrated to include two diodes in a forward biased configuration.

When an ESD surge is detected, as will be described in more detail below, the main protection sub-circuit 38 may dissipate and disperse the ESD energy into the ground rail 12. The on-state resistance ($rDS_{on}$) of the drain-to-source channel in the D-mode FET 40 and the on-state parasitic resistance of the diode stack 42 provide some resistance to the main protection sub-circuit 38 in order to prevent a dead short between the node 30 and the ground rail 12 during an ESD surge event.

The trigger sub-circuit 36 includes a diode 44 positioned in a reverse-breakdown configuration. A diode, such as the diode 44, which can operate in a reverse-breakdown mode will have a voltage associated with it at which reverse-breakdown begins and the diode begins to reverse conduct. This voltage can be, for example, eighteen (18) volts for certain technologies. As described above, the instantaneous voltage of a pHEMT switch can be more than three (3) times the power supply. For a six-volt power rail, an ESD protection circuit should remain inactive for voltages lower than approximately eighteen (18) volts. Accordingly, the diode 44 may begin to conduct at voltage levels associated with an ESD surge and will not conduct at normal operating voltages for the protected circuit 14.

As voltage associated with an ESD surge increases on the signal pin 20, the node 30 experiences an increase in voltage as well. As the voltage increases on the node 30, voltage also increases on the cathode of the diode 44. When the voltage increases sufficiently to cause the diode 44 to enter reverse-breakdown, current will begin to flow through the diode 44. Current will flow from the anode of the diode 44 into a resistor divider 46 to the ground rail 12.

The resistor divider 46 includes a bias resistor 48 and a current-limiting resistor 50. The bias resistor 48 and the current-limiting resistor 50 may be chosen according to the following equation 1.

$$V_{out} = V_{in} \cdot \frac{R_2}{R_1 + R_2} \quad (1)$$

Within equation 1, $R_1$ can be viewed as the bias resistor 48 and $R_2$ can be viewed as the current-limiting resistor 50. $V_{in}$ may be replaced with a voltage at a node 52 which connects the anode of the diode 44 with the resistor divider 46. $V_{out}$ may be viewed as the voltage at a node 54. The voltage at the node 54 represents the voltage that will control the gate of the D-mode FET 40.

Exemplary values for the bias resistor 48 and the current-limiting resistor 50 are 500 Ohms and 5 kohms, respectively. Accordingly, equation 1 may be solved to find that the voltage at the node 54 relative to the node 52 is nine tenths (9/10).

The values of the bias resistor 48 and the current-limiting resistor 50 may be adjusted in order to alter the gate-to-source voltage (Vgs) of the D-mode FET 40. As a result, the voltage at which the D-mode FET 40 turns on may be adjusted as desired. The current-limiting nature of the resistor divider 46 allows the bulk of the ESD energy in an ESD surge to be dissipated and dispersed through the main protection sub-circuit 38. Accordingly, the components within the trigger sub-circuit 36 may be physically smaller relative to the components within the main protection sub-circuit 38. As a result, components within the trigger sub-circuit 36 may consume a smaller area on the IC die which may translate into cost savings for the ESD protection circuit 34.

The ESD protection circuit 34 provides for ESD surge protection for a positive-going ESD surge. By adding an additional circuit identical to ESD protection circuit 34 and swapping the signal pin 20 and ground rail 12 connections to the second circuit, ESD protection for negative-going ESD surge events may be provided.

Additionally, negative-going ESD surge events may be smaller in magnitude than positive-going ESD surge events. Accordingly, a negative-going ESD protection circuit 56 is illustrated within FIG. 4 as a reverse-biased diode stack. The reverse-biased diode stack within negative-going ESD protection circuit 56 is represented by two diodes. Accordingly, negative-going ESD surge events will cause the two diodes to forward bias and the negative-going ESD surge event may be clamped to the ground rail 12 at a voltage representative of two forward biased diode drops. Because the two diodes of the negative-going ESD protection circuit 54 provide a lower impedance path to the ground rail 12 than the input of the protected circuit 14 when they are forward biased, negative-going ESD energy may be dissipated and dispersed into the ground rail 12 rather than into the protected circuit 14.

For the embodiments that follow, it is understood that a circuit, such as negative-going ESD protection circuit 54, or an additional ESD protection circuit, such as ESD protection circuit 34 with the signal and ground swapped, may be provided without departure from the subject matter described herein.

Figure 5:
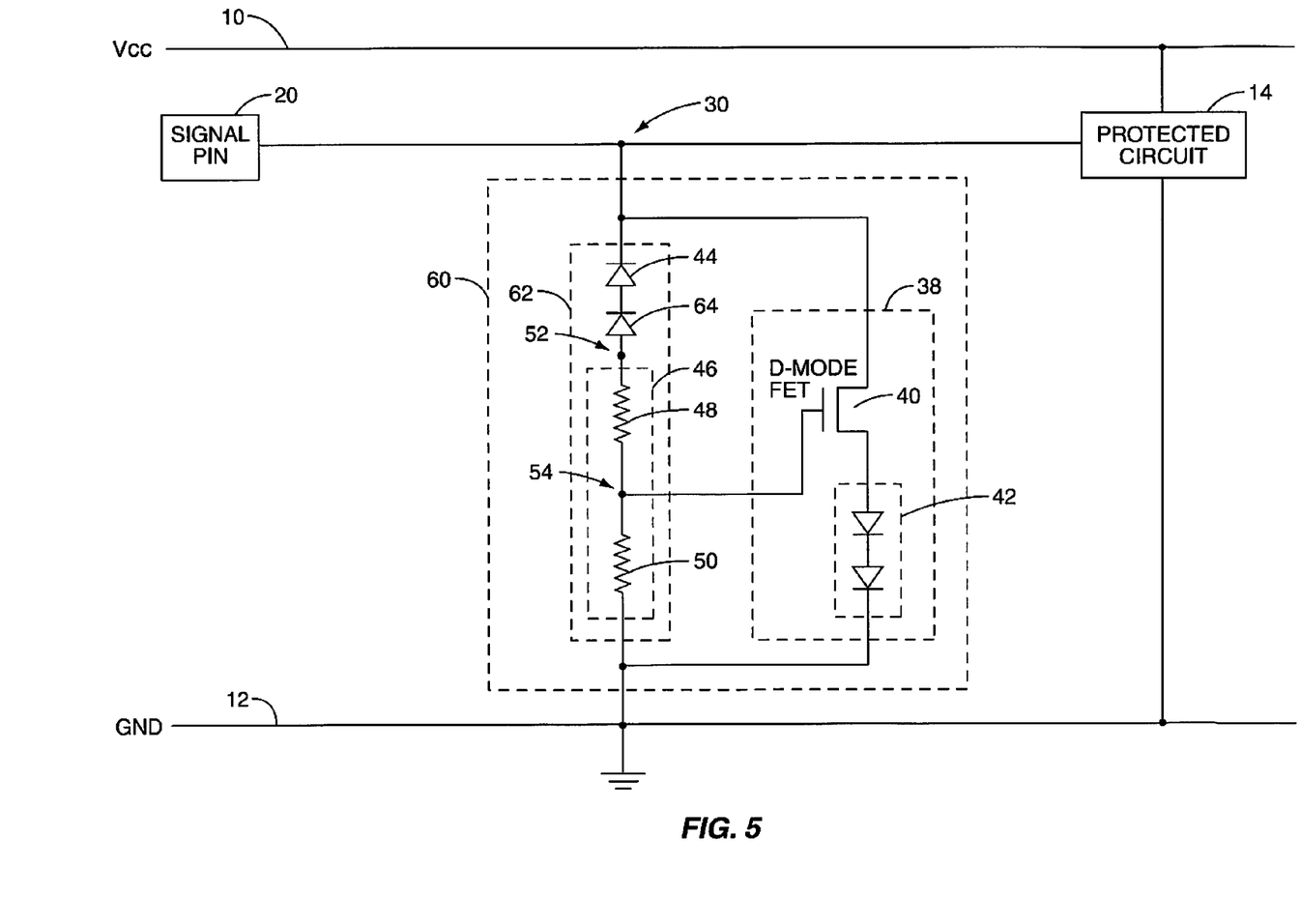
FIG. 5 illustrates an exemplary ESD embodiment of the present invention which includes an additional diode operating in reverse-breakdown mode within the trigger sub-circuit to increase the ESD trigger voltage.

FIG. 5 illustrates an exemplary embodiment of the present invention. An ESD protection circuit 60 is illustrated including a trigger sub-circuit 62 and a main protection sub-circuit 38. Main protection sub-circuit 38 may be included in any of the alternative embodiments described above or within the scope of the subject matter described herein.

The trigger sub-circuit 62 includes the diode 44 and the resistor divider 46 as previously described. In addition, a diode 64 is illustrated in this embodiment. The diode 64 is also oriented in a reverse-breakdown configuration along with the diode 44. Accordingly, the reverse-breakdown voltage of the two diodes adds and the detection and trigger voltage of the ESD protection circuit 60 is approximately twice that of the embodiment described above in association with FIG. 4. As a result, for an exemplary reverse-breakdown voltage of eighteen (18) volts for each of the diode 44 and the diode 64, the trigger voltage for the ESD protection circuit 60 will be approximately thirty-six (36) volts.

In this way, different ESD detection and trigger voltages may be selected for the ESD protection circuits described herein while still maintaining minimal dimensions for the components within the trigger circuitry relative to the component sizes within the main protection sub-circuit 38. Additionally, because the trigger sub-circuit 62 conducts a relatively small amount of current due to the current-limiting capabilities of the resistor divider 46, the additional on-state resistance and parasitic capacitance of the diode 64 imposes minimal effect on operation of ESD protection circuit 60 and for the normal operation of the protected circuit 14.

Figure 6:
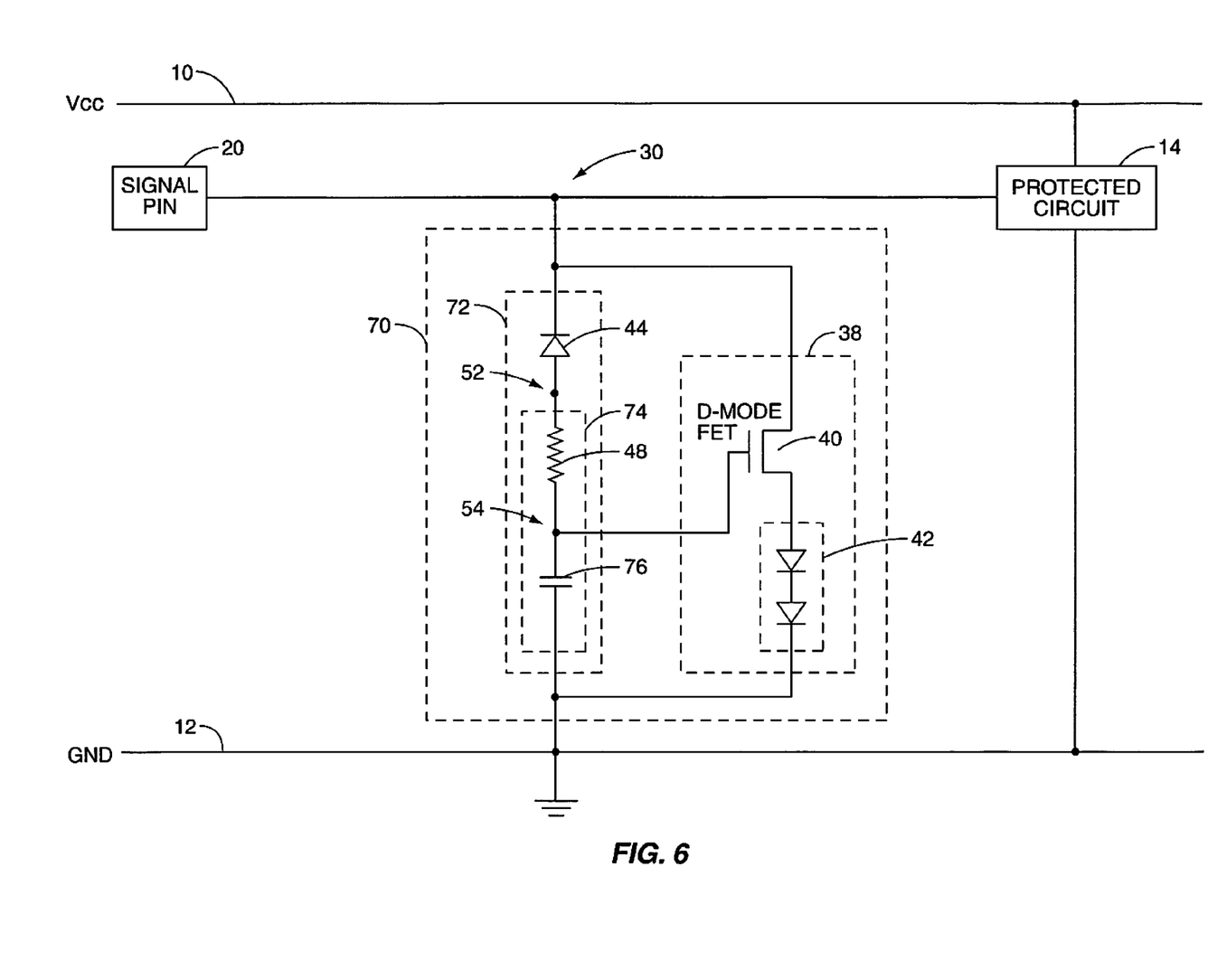
FIG. 6 illustrates an exemplary embodiment of the present invention where the resistor divider in the trigger sub-circuit is replaced with a resistor/capacitor (R/C) network in order to control the main protection sub-circuit relative to the RIC time constant of the RIC network.

FIG. 6 illustrates an exemplary embodiment of the present invention. An ESD protection circuit 70 is illustrated including a trigger sub-circuit 72 and the main protection sub-circuit 38. As can be seen from FIG. 6, the main protection sub-circuit 38 remains unchanged in this embodiment. Additionally, only the diode 44 is present within the trigger sub-circuit-circuit 72, which means that the voltage level at which the trigger sub-circuit 72 defeats on ESD surge event and begins to conduct current is at the voltage level associated with reverse-breakdown of the diode 44. If a different trigger voltage is desired, the characteristics for reverse-breakdown of the diode may be changed or additional diodes may be placed in a reverse-biased configuration, as described above.

An R/C circuit 74 is illustrated including the bias resistor 48, as in previous embodiments, and a capacitor 76. The capacitor 76 provides current-limiting capabilities, as previously provided by current-limiting resistor 50 in the previous embodiments. Additionally, the capacitor 76 may be selected to vary the turn-on time of the main protection sub-circuitcircuit 38. As the reverse-biased diode 44 begins to conduct during an ESD surge event, current will begin to flow through bias resistor 48 as the voltage at the node 52 begins to rise, thereby causing the bias resistor 48 to conduct. As the capacitor 76 begins to charge, the voltage at node 54 begins to rise. Capacitor 76 will allow a small amount of energy to dissipate to the ground rail 12, and current limiting within the trigger sub-circuit 72 will be achieved.

Additionally, the R/C circuit 74 provides R/C filtering capabilities for the ESD protection circuit 70, and accordingly, for the trigger sub-circuit 72. Components may be selected for the bias resistor 48 and the capacitor 76 in order to tune a time constant for the R/C circuit 74. The time constant associated with the R/C circuit 74 is represented by equation 2 below.

$$t = \frac{1}{R/C} \quad (2)$$

An R/C combination may be chosen depending upon the characteristics of the main protection sub-circuit 38. It may be desirable to select an R/C time constant so that the resulting time, t, in equation 2 causes the voltage at the node 54, and accordingly, the gate of the D-mode FET 40 to rise rapidly and turn the main protection sub-circuit 38 on very quickly. In other embodiments, it may be desirable to turn the D-mode FET 40 on more smoothly in order to accommodate smaller energy ESD bursts.

Figure 7:
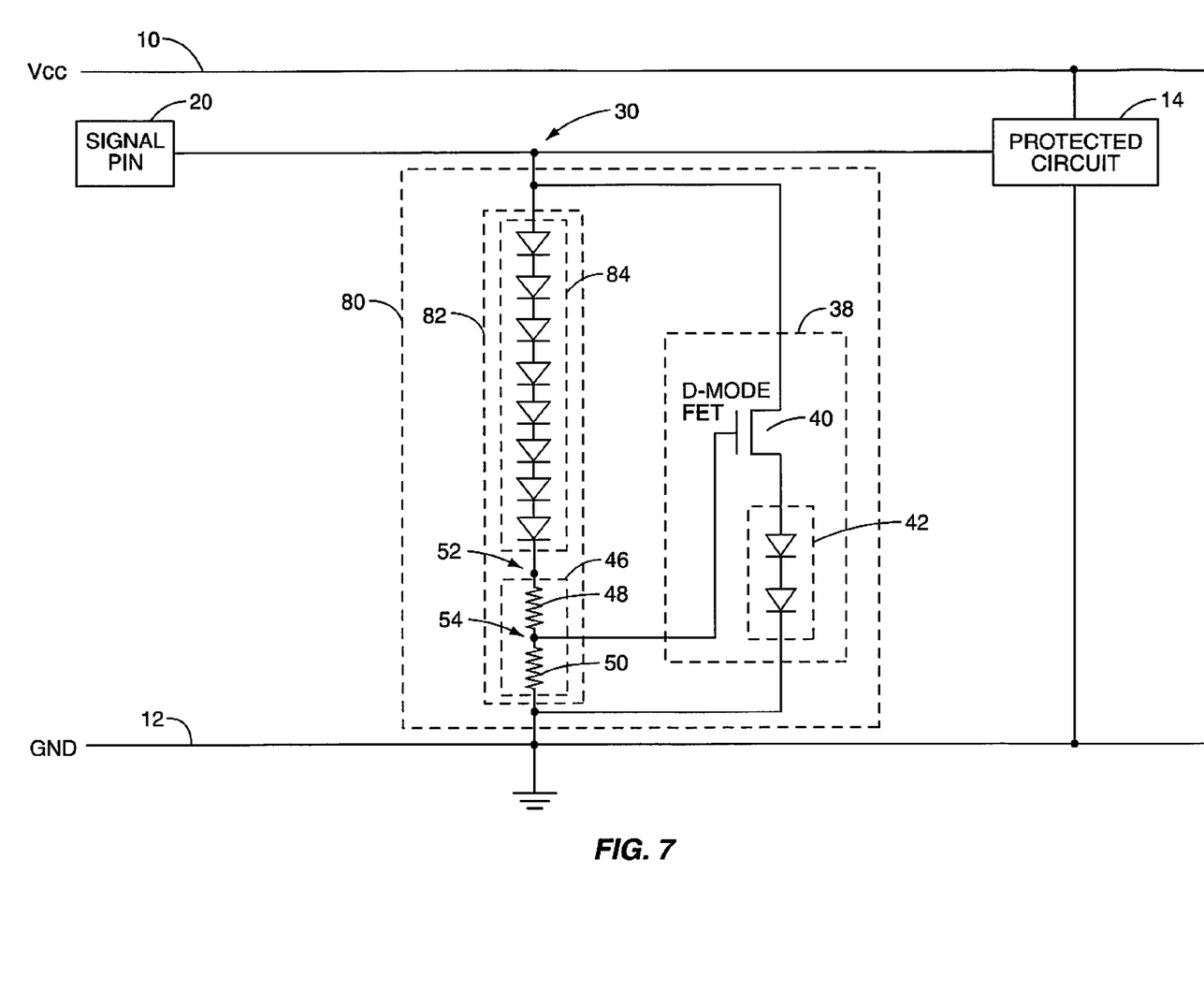
FIG. 7 illustrates an exemplary embodiment of the present invention where the diode operating in reverse-breakdown mode within the trigger sub-circuit is replaced by a forward biased diode stack.

FIG. 7 illustrates an exemplary embodiment of the present invention. An ESD protection circuit 80 is illustrated including a trigger sub-circuit 82 and the main protection sub-circuit 38. The trigger sub-circuit 82 includes a diode stack 84 and the resistor divider 46. It should be noted that the resistor divider 46 may be replaced with the R/C circuit 74 in any of the embodiments described herein.

The diode stack 84 provides for finer granularity in the selection of the ESD detection and trigger voltage for the ESD protection circuit 80. As can be seen in FIG. 7, diodes within the diode stack 84 are in a forward biased configuration. Accordingly, each diode experiences a forward biased voltage drop of approximately 0.6 to 0.7 volts when activated during an ESD surge event. As with the other embodiments described above, due to the current-limiting within the trigger sub-circuit 82, as provided by resistor divider 46, the on-state resistance within the diode stack 84 has minimal impact on operation of the ESD protection circuit 80 when compared to conventional diode stack ESD protection circuits. Additionally, because of the low current draw within the trigger sub-circuit 82, the diodes within the diode stack 84 may be smaller in dimension relative to diodes within the main protection sub-circuit 38, more specifically, the diode pair 42. Additionally, because a single diode stack 84 may be used because of the minimal impact of the series on-state resistance of the diode stack 84, parasitic capacitance may also be minimized with a diode stack configuration, such as the diode stack 84 within the trigger sub-circuit 82, when compared to paralleled diode stacks of conventional ESD protection circuitry.

Those skilled in the art will recognize improvements and modifications to the preferred embodiments of the present invention. All such improvements and modifications are considered within the scope of the concepts disclosed herein and the claims that follow.

What is claimed is:

1. A circuit providing electrostatic discharge (ESD) surge protection fabricated in pseudomorphic high electron mobility transistor (pHEMT) technology, comprising:
   a main protection sub-circuit including:
      a depletion-mode field effect transistor (D-Mode FET) adapted to turn on when triggered during an ESD surge event, wherein a drain terminal of the D-Mode FET is connected to a signal line to be protected during the ESD surge event; and
      at pinch-off diode stack connected in series and oriented in a forward biased configuration and including at least a first pinch-off diode and a second pinch-off diode, where an anode of the first pinch-off diode is connected to a source terminal of the D-Mode FET and a cathode of the second pinch-off diode is connected to a ground plane; and
   a trigger sub-circuit connected between the signal line to be protected and the ground plane and adapted to detect the ESD surge event and to trigger the main protection sub-circuit during the ESD surge event by increasing a voltage at a gate terminal of the D-Mode FET.

2. The circuit of claim 1, wherein the main protection sub-circuit is adapted to conduct ESD surge energy to the ground plane during the ESD surge event.

3. The circuit of claim 1, wherein the pinch-off diode stack is adapted to keep the D-Mode FET in an off state during times other than the ESD surge event and to conduct, in conjunction with the D-Mode FET, ESD surge energy to the ground plane during the ESD surge event.

4. The circuit of claim 1, wherein the trigger sub-circuit is adapted to limit current flow through the trigger sub-circuit during the ESD surge event.

5. The circuit of claim 1, wherein the trigger sub-circuit comprises:
   a trigger diode oriented in a reverse-biased orientation with a cathode of the trigger diode connected to the signal line to be protected during the ESD surge event; and
   a resistor divider including:
      a current-limiting resistor connected to the gate of the D-Mode FET at a first end and to the ground plane at a second end and adapted to limit current flow through the trigger sub-circuit during the ESD surge event; and
      a bias resistor connected to an anode of the trigger diode at a first end and to the gate of the D-Mode FET at a second end, and chosen in conjunction with the current-limiting resistor such that a voltage division created by the resistor divider is selected to trigger the D-Mode FET during the ESD surge event.

6. The circuit of claim 5, wherein the trigger sub-circuit provides a trigger voltage for the ESD surge protection circuit that is approximately a reverse-breakdown voltage for the trigger diode.

7. The circuit of claim 1, wherein the trigger sub-circuit comprises:
   a first trigger diode oriented in a reverse-biased orientation with a cathode of the first trigger diode connected to the signal line to be protected during the ESD surge event;
   a second trigger diode oriented in a reverse-biased orientation with a cathode of the second trigger diode connected to an anode of the first trigger diode; and
   a resistor divider including:
      a current-limiting resistor connected to the gate of the D-Mode FET at a first end and to the ground plane at a second end and adapted to limit current flow through the trigger sub-circuit during the ESD surge event; and a bias resistor connected to an anode of the second trigger diode at a first end and to the gate of the D-Mode FET at a second end, and chosen in conjunction with the current-limiting resistor such that a voltage division created by the resistor divider is selected to trigger the D-Mode FET during the ESD surge event.

8. The circuit of claim 7, wherein the trigger sub-circuit provides a trigger voltage for the ESD surge protection circuit that is approximately a reverse-breakdown voltage for the first trigger diode added to a reverse-breakdown voltage for the second trigger diode.

9. The circuit of claim 1, wherein the trigger sub-circuit comprises:
a trigger diode oriented in a reverse-biased orientation with a cathode of the trigger diode connected to the signal line to be protected during the ESD surge event; and
a resistor/capacitor (RIC) circuit including:
a capacitor connected to the gate of the D-Mode FET at a first end and to the ground plane at a second end and adapted to limit current flow through the trigger sub-circuit during the ESD surge event; and
a bias resistor connected to an anode of the trigger diode at a first end and to the gate of the D-Mode FET at a second end, and chosen in conjunction with the capacitor such that a R/C time constant is selected to adjust a trigger time for the D-Mode FET during the ESD surge event.

10. The circuit of claim 1, wherein the trigger sub-circuit comprises:
a trigger diode stack including a plurality of diodes connected in series and oriented in a forward-biased configuration with an anode of a first diode of the trigger diode stack connected to the signal line to be protected during the ESD surge event; and
a resistor divider including:
a current-limiting resistor connected to the gate of the D-Mode FET at a first end and to the ground plane at a second end and adapted to limit current flow through the trigger sub-circuit during the ESD surge event; and
a bias resistor connected to a cathode of a last diode of the trigger diode stack at a first end and to the gate of the D-Mode FET at a second end, and chosen in conjunction with the current-limiting resistor such that a voltage division created by the resistor divider is selected to trigger the D-Mode FET during the ESD surge event.

11. The circuit of claim 10, wherein a trigger voltage for the ESD surge protection circuit is selected by varying a number of diodes in the trigger diode stack.

12. The circuit of claim 1 further comprising a protected circuit connected between a power plane and the ground plane including a signal terminal connected to the signal line to be protected, wherein the ESD protection is provided to the protected circuit.

13. A circuit providing electrostatic discharge (ESD) surge protection fabricated in pseudomorphic high electron mobility transistor (pHEMT) technology, comprising:
means for detecting an ESD surge event;
means for limiting current flow within the means for detecting the ESD surge event;
means for triggering the ESD surge protection during the ESD surge event; and
means for conducting ESD surge energy to a ground plane during the ESD surge event.

14. The circuit of claim 13 wherein the means for detecting the ESD surge event include a trigger diode oriented in a reverse-biased orientation with a cathode of the trigger diode connected to a signal line to be protected during the ESD surge event and the means for limiting current flow include a resistor divider connected between an anode of the trigger diode and the ground plane.

15. The circuit of claim 14 wherein the means for triggering the ESD surge protection during the ESD surge event include an interconnection node that forms a connection between two resistors of the resistor divider connected to the means for conducting ESD surge energy to the ground plane during the ESD surge event.

16. The circuit of claim 15 wherein the means for conducting ESD surge energy to the ground plane during the ESD surge event include a depletion-mode field effect transistor (D-Mode FET) adapted to turn on when triggered by the means for triggering the ESD surge protection during the ESD surge event.

17. The circuit of claim 16 further comprising means to maintain the D-Mode FET in an off state during times other than the ESD surge event.

18. The circuit of claim 13 wherein the means for detecting the ESD surge event include a trigger diode oriented in a reverse-biased orientation with a cathode of the trigger diode connected to a signal line to be protected during the ESD surge event and the means for limiting current flow include a resistor/capacitor (R/C) circuit, wherein a capacitor within the R/C circuit provides current limiting.

19. The circuit of claim 13 wherein the means for detecting the ESD surge event include a first and a second trigger diode oriented in a reverse-biased orientation with a cathode of the first trigger diode connected to a signal line to be protected during the ESD surge event and an anode of the first trigger diode connected to a cathode of the second trigger diode and an anode of the second trigger diode connected to the means for limiting current flow.

* * * * *

UNITED STATES PATENT AND TRADEMARK OFFICE
CERTIFICATE OF CORRECTION

| | | |
|---|---|---|
| PATENT NO. | : 7,593,204 B1 | Page 1 of 1 |
| APPLICATION NO. | : 11/609497 | |
| DATED | : September 22, 2009 | |
| INVENTOR(S) | : Christian Rye Iversen et al. | |

It is certified that error appears in the above-identified patent and that said Letters Patent is hereby corrected as shown below:

In column 8 at line 11, change "at" to --a--.

In column 9 at line 21, change "(RIC)" to --R/C--.

Signed and Sealed this

Tenth Day of November, 2009

David J. Kappos
*Director of the United States Patent and Trademark Office*